May 4, 1965 P. H. BARTLETT 3,181,761
SEMI-TRAILER LIFT
Filed Jan. 16, 1963 3 Sheets-Sheet 1
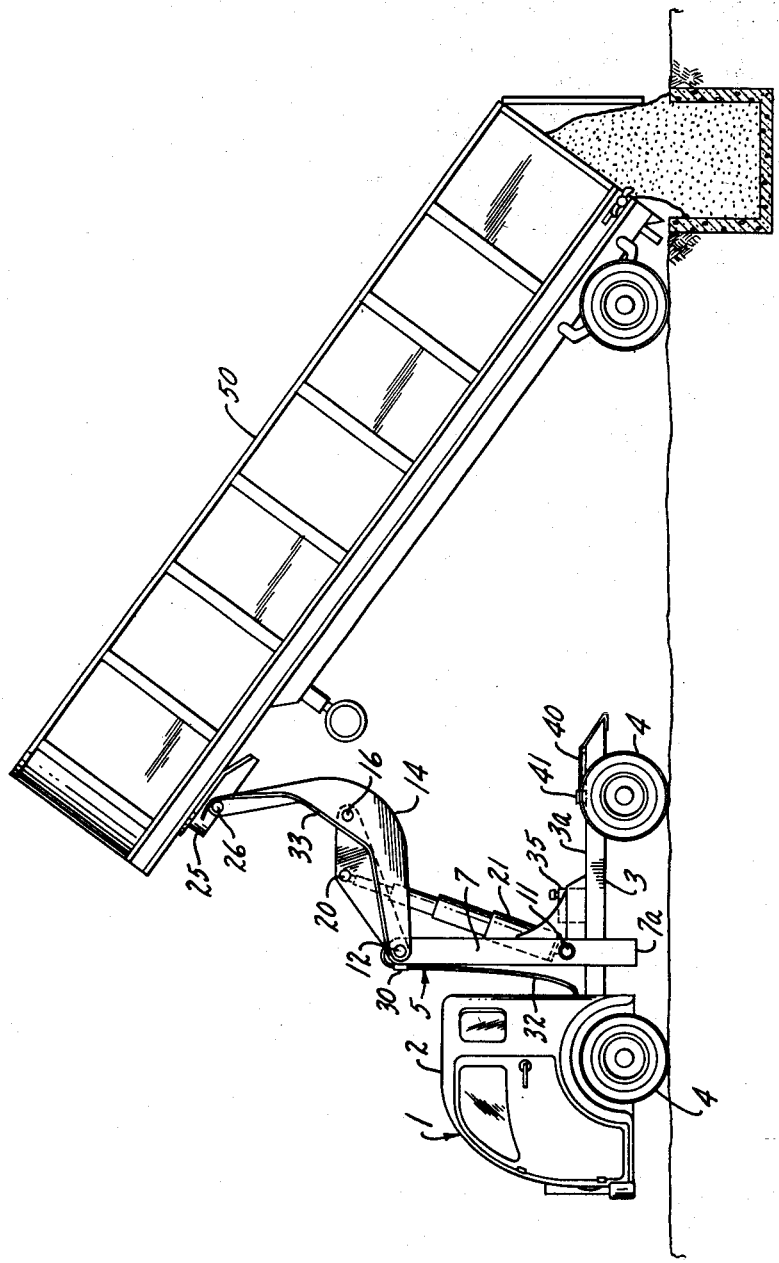
INVENTOR.
Percy H. Bartlett,
BY Parker & Carter
Attorneys.

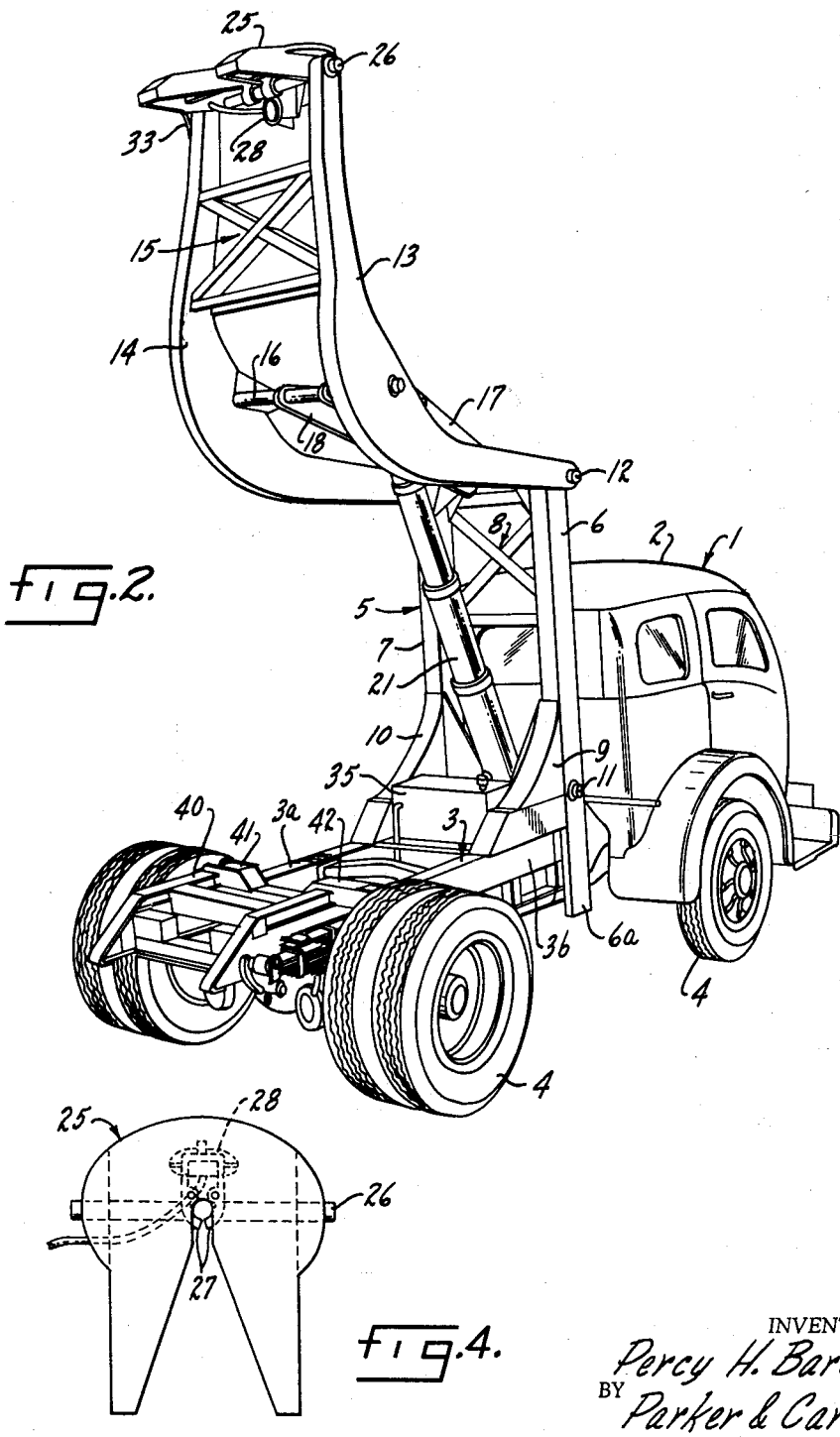

May 4, 1965 P. H. BARTLETT 3,181,761
SEMI-TRAILER LIFT
Filed Jan. 16, 1963 3 Sheets-Sheet 3
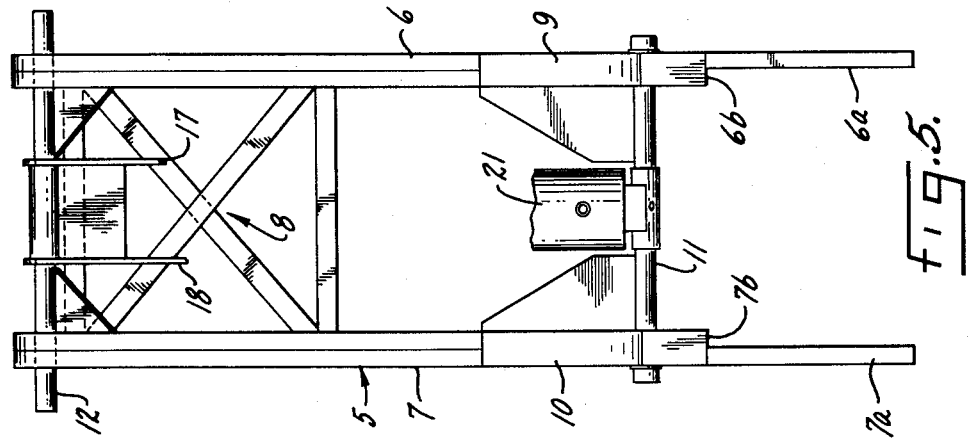
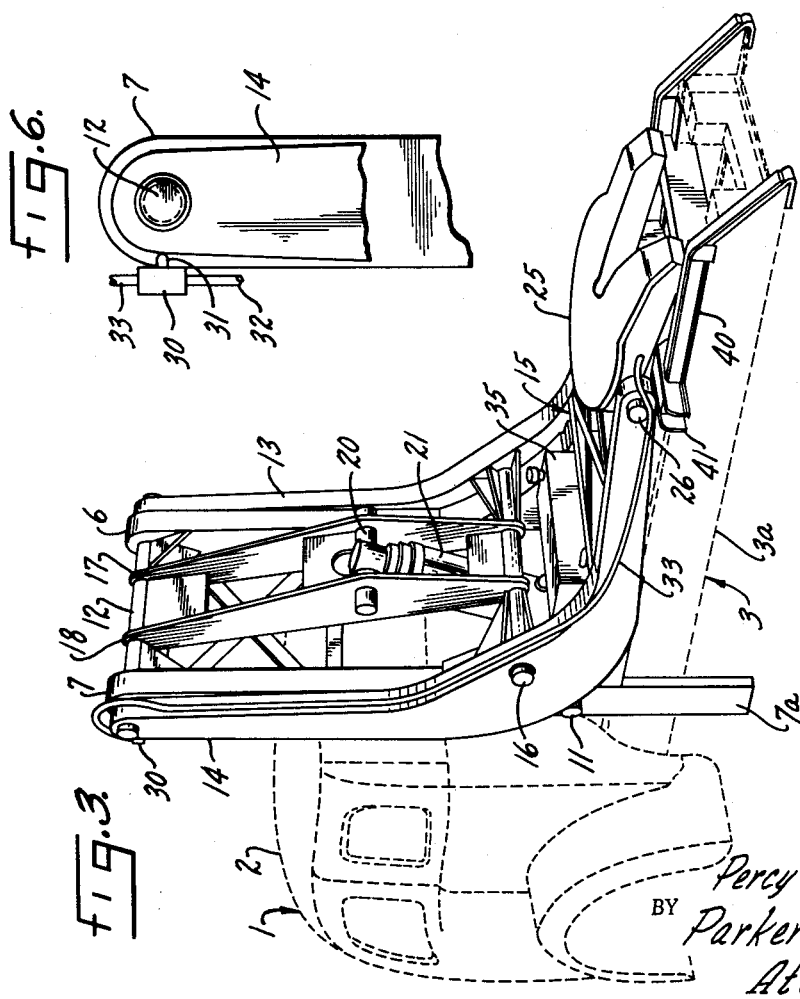
INVENTOR.
Percy H. Bartlett,
BY Parker & Carter
Attorneys.

3,181,761
SEMI-TRAILER LIFT
Percy H. Bartlett, Riverside, Ill., assignor to Bartlett Trailer Corporation, Chicago, Ill., a corporation of Illinois
Filed Jan. 16, 1963, Ser. No. 251,844
14 Claims. (Cl. 298—20)

This invention relates to truck-trailer combinations and has particular relation to a means for lifting a trailer to dump the contents thereof.

One purpose of the invention is to provide a trailer lift mechanism capable of lifting a trailer portion to a height of the order of 18 feet above the ground.

Another purpose is to provide a trailer lift mechanism capable of lifting a trailer portion to a maximum height without inducing dangerous wobble of the trailer in raised position.

Another purpose is to provide a mechanism effective to secure and draw a trailer in one position and to raise the trailer to tip it when in another position.

Another purpose is to provide a trailer lift mechanism of maximum compactness and minimum spatial requirements.

Another purpose is to provide a kit installable upon a standard truck-tractor and effective to lift any trailer associated therewith.

Another purpose is to provide a lift assembly effective safely to permit movement of a trailer when said trailer is in dumping position.

Another purpose is to provide a lifting fifth wheel mechanism capable of being packaged, shipped and installed in kit form.

The permissible length of trailers has increased until a length of 40 feet is no longer uncommon. In order to fully discharge the load therefrom by dumping, it becomes necessary to raise the forward portion of such trailers to a maximum height. It is, accordingly, one purpose of the invention to provide means for fully discharging trailers of maximum length.

Another purpose is to provide a lift mechanism, the geometry of which is effective to produce the lifting of a trailer portion to a height above the ground in the order of 18 feet.

Another purpose is to provide a lift mechanism having means for insuring against separation of a trailer therefrom when said trailer is in raised position.

Other purposes will appear from time to time during the course of the specification and claims.

The invention is illustrated more or less diagrammatically in the accompanying drawings, wherein:

FIGURE 1 is a side view;
FIGURE 2 is a perspective view with parts in one position;
FIGURE 3 is a perspective view with part in another position;
FIGURE 4 is a top plan view;
FIGURE 5 is a detailed end view; and
FIGURE 6 is a detailed view on an enlarged scale.

Like parts are indicated by like numerals throughout the specification and drawings.

Referring now to the drawings, the numeral 1 generally indicates a truck or tractor. The tractor 1 has a cab 2, a frame 3 and a set of ground-contacting wheel members which are indicated at 4.

Indicated generally at 5 is a base or support frame consisting of a pair of spaced, parallel, upstanding, rigid members 6, 7. The members 6, 7 may be conveniently formed of opposed channel segments, the inner of said segments being shorter than the outer to create downwardly extending leg portions 6a, 7a, the offsets created by the shorter inner channel segments being indicated, respectively, at 6b, 7b. Suitable cross-bracing, indicated generally by the numeral 8, is provided between upper portions of the support legs 6, 7. Bracing fillets 9, 10 are secured to lower portions of the legs 6, 7 and extend in parallel therefrom, the lower surfaces of the braces 9, 10 being in the plane of the offsets 6b, 7b.

A shaft 11 extends through and between the legs 6, 7 just above the plane of the offsets 6b, 7b. A shaft 12 extends through and between the legs 6, 7 adjacent their uppermost ends.

A pair of spaced, parallel, generally L-shaped lift arms 13, 14 extend from the uppermost ends of the legs 6, 7. Each of the arms 13, 14 has one of its ends pivoted to outwardly extending portions of shaft 12 on the opposite sides of legs 6, 7, respectively. Suitable bracing, indicated generally by the numeral 15, is secured to and between the arms 13, 14 adjacent their outer ends.

A shaft 16 extends between the arms 13, 14 at a point intermediate the ends thereof. A pair of spaced, parallel, plate-like brackets are indicated at 17, 18. Each of the brackets 17, 18 has one end engaging the shaft 16 and an opposite end pivotally supported on an intermediate portion of shaft 12 between supports 6, 7. A shaft 20 extends between opposed intermediate portions of the bracket members 17, 18. A telescopic, fluid-powered cylinder 21 has a lower portion pivotally secured to the shaft 11 intermediate its ends and its upper end pivotally secured to the shaft 20 intermediate its ends.

A fifth wheel assembly 25 is positioned between the opposite or outer ends of the arms 13, 14 and is pivotally mounted on a shaft 26 extending between said outer arm ends. It will be observed that the fifth wheel 25 is mounted on the shaft 26 at a point in substantial alignment with the jaws 27 of the fifth wheel member 25. Operating mechanism for the jaws 27 is mounted on and beneath the fifth wheel 25, as indicated at 28.

Indicated at 30 is a safety control valve, the same being mounted upon an upper portion of the leg 7. The valve 30 has an outwardly extending operating arm 31 positioned for contact by an opposed end portion of leg 14 when the same is pivoted about the shaft 12, as appears more fully below. Fluid pressure lines 32, 33 extend to the valve 30 and from the valve 30 to the jaw-operating mechanism 28.

It will be understood that suitable mechanism, such as a power takeoff, a fluid pressure pump, a fluid pressure regulator and the like, is provided for installation conveniently within the cab where suitable control mechanism may be operated by the vehicle operator. A reservoir 35 is positioned between and secured to the fillets 9, 10 and may contain hydraulic fluid when the fluid pressure cylinder 21 is to be operated by hydraulic fluid. Suitable lines are provided for connection of the reservoir 35 with the mechanism just described.

A seat assembly, indicated generally by the numeral 40, is provided for attachment to the rear end of the chassis 3 and includes a pair of spaced, raised pads 41, 42 on which the outer ends of arms 14, 13, respectively, seat when the device of the invention is at rest.

The use and operation of the invention are as follows:

A kit is provided which may be easily and conveniently installed on a standard tractor chassis. Such chassis includes a pair of spaced, parallel members or runners indicated in the drawings herein at 3a, 3b, the said members being spaced apart a distance of 34 inches. The support 5 is placed upon a forward portion of the runners 3a, 3b adjacent the cab 2. The invention may be installed on any standard chassis, regardless of the length thereof. For a longer chassis the support structure 5 would be simply moved along the members 3a, 3b toward the rear of the chassis. With the support 5 thus in position on the chassis 3 the depending segments 6a, 7a of legs 6, 7 are welded to the sides of the members 3a, 3b and the lower surfaces of the fillets 9, 10 are welded to the upper surfaces of the members 3b, 3a, respectively. The offsets 6b, 7b similarly seat upon and are welded to the upper surface of the members 3b, 3a, respectively. The reservoir 35, being previously secured to the inner surfaces of the fillets 9, 10, is thus positioned on the tractor 1 between the chassis members 3a, 3b.

Since all of the structure of the invention, with the exception of the assembly, is in turn mounted on the support 5, it will be seen that the entire structure of the invention has been installed when the support structure 5 has thus been secured to the chassis of the vehicle 1. The assembly 40 is similarly merely placed upon the upper surface of a rear portion of the chassis members 3a, 3b and welded thereto.

The safety member 30, secured to an upper portion of leg 7, has its line 33 secured to the jaw-operating mechanism 28. Assembly merely requires that the line 32 be secured to suitable controls within the cab 2. With the arms 13, 14 in their down or rest position the valve-operating rod 31 is in extended position and the jaws 27 may be opened by air pressure through line 32, valve 30 and line 33. The moment the arms 13, 14 begin to move upwardly, however, from their down position, an end surface of arm 14 is brought into contact with rod 31 to depress the same and to operate valve 30 and thereby to close off the supply of air to jaw-operating mechanism 28. Thereafter the jaws 27 cannot be opened and the trailer, such as that indicated at 50 in FIGURE 1, cannot be separated from the structure of the invention and therefore from the tractor 1 while the trailer is in any raised position. Upon return of the structure of the invention to its down or rest position, and consequent return of the trailer 50 to its horizontal position, the rod 31 returns to its extended position and valve 30 is opened to permit opening of the jaws 27 and consequent separation of the trailer 50 from the tractor 1.

With the structure of the invention trailers have been raised to a height above the ground of 18.8 inches. Any trailer which may be engaged by the fifth wheel 25 may be lifted to this height by the structure of the invention. Prior to operating the suitable controls provided to extend the telescopic cylinder 21, the operator locks the wheels of either the tractor 1 or the trailer 50. If the wheels of the tractor 1 be locked, operation of cylinder 21 will cause upward movement of the forward portion of the trailer 50 and the wheels at the rear of trailer 50 will thereupon move toward tractor 1. Conversely, if the trailer wheels be locked prior to operation of cylinder 21, the tractor 1 will be drawn rearwardly toward the trailer wheels upon operation of cylinder 21. The geometry involved in the location of shafts or pivot points 12, 26 and of shafts or pivot points 11 and 20, however, is such as to produce a minimal variance in the relative position of the tractor and trailer, as well as a rigid assembly in both raised and lowered positions.

Operation of the fluid-power mechanism 21 causes an upward movement of shaft 20 to which the upper portion of cylinder and piston assembly 21 is pivotally secured. Movement of the shaft 20 carries with it a movement of the bracket formed by members 17, 18 and a consequent upward movement of the arms 13, 14 and the fifth wheel 25 secured thereto. The trailer 50 which is secured to the fifth wheel 25, and which remains secured thereto throughout the movement of the arms 14, 13, as above described, is thereby raised. The fifth wheel 25, being pivotally supported at the ends of arms 13, 14, pivots about its shaft 26 as the trailer is raised and lowered. The shaft 26 is in substantial alignment with the center of the jaws 27 and consequently with the kingpin which extends downwardly from the trailer 50 for engagement by the jaws 27. Thus the securement of the trailer 50 to fifth wheel 25 and the securement of fifth wheel 25 to the arms 13, 14 are aligned and the fifth wheel describes only a limited-variance path in its excursion between its low and high positions. The arms 14, 13 being spaced and parallel, as are supports 6, 7, the trailer may be drawn by the tractor when the assembly of the invention is in the fully raised position of FIGURE 1, as well as when it is in the position of FIGURE 3.

The provision of the pivot point represented by shaft 12 at a forward point of chassis 3 and adjacent or above the roof of cab 2 enables the safe and effective lifting of the forward trailer portion to a greatly increased height. This is true even though the cylinder and piston assembly 21 be of limited maximum extension. This same positioning, coupled with the provision of generally L-shaped arms 13, 14, provides for installation of the structure of the invention in presently available and unused space in standard tractor-trailer combination vehicles and without substantial modification or cutting away of any portions of the tractor or tractor chassis. The arms 13, 14 serve as both lift and draft arms with the trailer respectively in the dumping or lowered or normal transport position.

Whereas there has been shown and described an operative form of the invention, it should be understood that this showing and description are to be taken in an illustrative or diagrammatic sense only. There are many modifications in and to the invention which will be apparent to those skilled in the art and which will fall within the scope and spirit of the invention. The scope of the invention should, therefore, be limited only by the scope of the hereinafter appended claims.

What is claimed:

1. A lifting structure for a tractor-trailer combination, including a support adapted for mounting on the tractor, said support including a pair of spaced members with their upper ends terminating at a point adjacent the roof of the tractor cab, a pair of L-shaped arms pivotally mounted at one of their ends to said support upper ends, a fifth wheel pivotally mounted on the opposite ends of said L-shaped arms, and a fluid power mechanism pivotally secured to said support and said L-shaped arms, kingpin engaging jaws carried by said fifth wheel and means carried by said support and operable in response to initial movement of said arms by said power mechanism to prevent opening of said jaws.

2. In combination, a tractor having a chassis, a forward set of ground-contacting wheels on said tractor, a rear set of ground-contacting wheels on said tractor, a pair of spaced, parallel supports secured to said chassis at a point intermediate said forward and rear wheels and extending upwardly from said chassis, a pair of spaced, parallel, generally L-shaped arms, each of said arms having one of its ends pivotally mounted adjacent the uppermost end of one of said supports, a fifth wheel pivotally mounted on and between the opposite ends of said arms, and means carried by said supports and engaging said arms to move the same about said first-named pivot point, said arms each having substantially equal portions on opposite sides of their mid-point, each of said arms being movable between a draft position, in which one of said portions is substantially vertical and the other of said portions is substantially horizontal, and a maximum raised position in which said one portion is substantially horizontal and said other portion is substantially vertical.

3. In combination, a tractor having a chassis, a forward set of ground-contacting wheels on said tractor, a rear set of ground-contacting wheels on said tractor, a pair of spaced, parallel supports secured to said chassis at a point intermediate said forward and rear wheels and extending upwardly from said chassis, a pair of spaced, parallel, generally L-shaped arms, each of said arms having one of its ends pivotally mounted adjacent the uppermost end of one of said supports, a fifth wheel pivotally mounted on and between the opposite ends of said arms, means carried by said supports and engaging said arms to move the same about said first-named pivot point, said means comprising a telescopic cylinder pivotally mounted on and between said supports adjacent said chassis at one end of said telescopic cylinder, a bracket pivotally secured to said supports adjacent their upper ends and to said arms adjacent intermediate portions thereof, said telescopic cylinder having its opposite end pivotally secured to said bracket, a trailer having a kingpin adjacent its forward end and a set of ground-contacting wheels adjacent its rearward end, said fifth wheel having kingpin-engaging jaws, said kingpin being engaged by said jaws, and fluid pressure means carried by said fifth wheel for operating said jaws, means operable in response to initial upward movement of said arms and effective to preclude release of said kingpin from said jaws.

4. A combination lift and draft assembly for tractor-trailer combinations and the like, said assembly comprising a pair of vertically extending supports, a shaft extending between the upper ends of said supports, a pair of L-shaped arms, each of said arms having one of its ends pivoted on said shaft, the opposite end portions of said arms extending rearwardly, substantially perpendicularly to said supports when said arms are in draft position, a fifth wheel pivotally carried by said opposite ends of said arms, and fluid pressure means carried by said supports and engaging said arms between said first-named ends and the mid-points thereof, said fluid pressure means being effective to raise said arms pivotally about said shaft to move said arms and fifth wheel upwardly above the upper ends of said supports and to position said opposite arm end portions in planes substantially paralleling said supports.

5. A kit for tractors having a cab and a chassis, said kit comprising a pair of parallel, vertical uprights, the upper ends of said uprights terminating at a point above said cab, a first shaft extending between and outwardly of the upper ends of said uprights, a second shaft extending between intermediate points of said uprights, the lower ends of said uprights extending downwardly from said second shaft for attachment to said chassis, a pair of parallel, L-shaped arms, each of said arms having one of its ends pivotally mounted on an outwardly extending portion of said first shaft, one leg of each of said L-shaped arms lying along the outer surface of one of said uprights when said arms are in draft position, the other leg of each of said arms lying alongside and substantially paralleling said chassis when said arms are in said position, a fifth wheel pivotally mounted between and carried by the opposite ends of said L-shaped arms, a telescopic cylinder assembly having its lower portion pivotally mounted on said second shaft, a bracket pivotally mounted at one of its ends to said first shaft between said supports and secured to intermediate portions of said arms, said telescopic cylinder assembly being pivotally mounted at its upper end to an intermediate portion of said bracket.

6. A kit for tractors having a cab and a chassis, said kit comprising a pair of parallel, vertical uprights, the upper ends of said uprights terminating at a point above said cab, a first shaft extending between and outwardly of the upper ends of said uprights, a second shaft extending between intermediate points of said uprights, the lower ends of said uprights extending downwardly from said second shaft for attachment to said chassis, a pair of parallel, L-shaped arms, each of said arms having one of its ends pivotally mounted on an outwardly extending portion of said first shaft, one leg of each of said L-shaped arms lying along the outer surface of one of said uprights when said arms are in draft position, the other leg of each of said arms lying alongside and substantially paralleling said chassis when said arms are in said position, a fifth wheel pivotally mounted between and carried by the opposite ends of said L-shaped arms, a telescopic cylinder assembly having its lower portion pivotally mounted on said second shaft, a bracket pivotally mounted at one of its ends to said first shaft between said supports and secured to intermediate portions of said arms, said telescopic cylinder assembly being pivotally mounted at its upper end to an intermediate portion of said bracket, and a fillet secured to an intermediate portion of each of said supports and extending along and above said chassis for connection thereto.

7. A kit for tractors having a cab and a chassis, said kit comprising a pair of parallel, vertical uprights, the upper ends of said uprights terminating at a point above said cab, a first shaft extending between and outwardly of the upper ends of said uprights, a second shaft extending between intermediate points of said uprights, the lower ends of said uprights extending downwardly from said second shaft for attachment to said chassis, a pair of parallel, L-shaped arms, each of said arms having one of its ends pivotally mounted on an outwardly extending portion of said first shaft, one leg of each of said L-shaped arms lying along the outer surface of one of said uprights when said arms are in draft position, the other leg of each of said arms lying alongside and substantially paralleling said chassis when said arms are in said position, a fifth wheel pivotally mounted between and carried by the opposite ends of said L-shaped arms, a telescopic cylinder assembly having its lower portion pivotally mounted on said second shaft, a bracket pivotally mounted at one of its ends to said first shaft between said supports and secured to intermediate portions of said arms, said telescopic cylinder assembly being pivotally mounted at its upper end to an intermediate portion of said bracket, and a fillet secured to an intermediate portion of each of said supports and extending along and above said chassis for connection thereto, and a reservoir carried between said fillets.

8. A kit for tractors having a cab and a chassis, said kit comprising a pair of parallel, vertical uprights, the upper ends of said uprights terminating at a point above said cab, a first shaft extending between and outwardly of the upper ends of said uprights, a second shaft extending between intermediate points of said uprights, the lower ends of said uprights extending downwardly from said second shaft for attachment to said chassis, a pair of parallel L-shaped arms, each of said arms having one of its ends pivotally mounted on an outwardly extending portion of said first shaft, one leg of each of said L-shaped arms lying along the outer surface of one of said uprights when said arms are in draft position, the other leg of each of said arms lying alongside and substantially paralleling said chassis when said arms are in said position, a fifth wheel pivotally mounted between and carried by the opposite ends of said L-shaped arms, a telescopic cylinder assembly having its lower portion pivotally mounted on said second shaft, a bracket pivotally mounted at one of its ends to said first shaft between said supports and secured to intermediate portions of said arms, said telescopic cylinder assembly being pivotally mounted at its upper end to an intermediate portion of said bracket, a fillet secured to an intermediate portion of each of said supports and extending along and above said chassis for connection thereto, a reservoir carried between said fillets, and a pad assembly carried by said chassis and positioned for reception of said opposite ends of said L-shaped arms when said arms are in draft position.

9. In combination, a tractor having a cab, a chassis including a pair of spaced, parallel runners extending rearwardly from said cab, a set of ground-contacting wheels beneath said cab, a set of ground-contacting wheels beneath the rear section of said chassis, a fifth wheel positioned above said second set of tractor wheels, a trailer having a set of ground-contacting wheels beneath its rear portion and a kingpin beneath its forward portion, said kingpin engaging said fifth wheel, the forward portion of said trailer being rearwardly spaced from said cab, a pair of uprights secured adjacent their lower ends to said chassis runners and extending upwardly in parallel relationship through the space between said cab and trailer, said uprights terminating at a point above said cab, a pair of L-shaped arms, said arms having one of their ends pivotally secured to an upper portion of said uprights above said cab, the opposite ends of said L-shaped arms being pivotally connected to and carrying said fifth wheel, a power cylinder pivotally carried by said uprights adjacent said chassis and secured to said L-shaped arms for rotating the same about said pivot point on the upper portion of said uprights to tip said trailer, said fifth wheel including kingpin-engaging jaws, means for opening said jaws carried by said fifth wheel, a valve carried by one of said uprights and arranged to control the operation of said jaws, a valve-operating member positioned for contact by one of said L-shaped arms in response to initial movement of said L-shaped arms toward trailer tipping position to operate said valve and to preclude opening of said jaws.

10. In combination, a tractor having a cab, a chassis including a pair of spaced, parallel runners extending rearwardly from said cab, a set of ground-contacting wheels beneath said cab, a set of ground-contacting wheels beneath the rear section of said chassis, a fifth wheel positioned above said second set of tractor wheels, a trailer having a set of ground-contacting wheels beneath its rear portion and a kingpin beneath its forward portion, said kingpin engaging said fifth wheel, the forward portion of said trailer being rearwardly spaced from said cab, a pair of uprights secured adjacent their lower ends to said chassis runners and extending upwardly in parallel relationship through the space betwen said cab and trailer, said uprights terminating at a point above said cab, a pair of L-shaped arms, said arms having one of their ends pivotally secured to an upper portion of said uprights above said cab, the opposite ends of said L-shaped arms being pivotally connected to and carrying said fifth wheel, a power cylinder pivotally carried by said uprights adjacent said chassis and secured to said L-shaped arms for rotating the same about said pivot point on the upper portion of said uprights to tip said trailer, a brace secured to each of said uprights and extending rearwardly above said chassis toward said second set of ground-contacting wheels, each of said braces being secured to one of said runners on said chassis, and a reservoir carried between said braces.

11. A kit for tractors and the like comprising a pair of spaced, parallel uprights, a shaft extending between the upper ends of said uprights, a pair of parallel L-shaped arms, each of said L-shaped arms having one of its ends pivotally mounted on said shaft, each of said arms having a leg paralleling one of said uprights when said arms are in draft position each of said arms having a second leg extending substantially perpendicularly from said uprights when said arms are in draft position, a fifth wheel pivotally carried by the outer end of said last-named legs, and means carried by said uprights and enging said first-named legs of said arms to pivot the same about said shaft, to raise said fifth wheel above the upper ends of said uprights, to move said first-named legs to a position extending substantially perpendicularly to said uprights and to move said second legs into a position substantially paralleling said uprights.

12. A kit for tractors and the like comprising a pair of spaced, parallel uprights, a shaft extending between the upper ends of said uprights, a pair of parallel L-shaped arms, each of said L-shaped arms having one of its ends pivotally mounted on said shaft, each of said arms having a leg paralleling one of said uprights when said arms are in draft position, each of said arms having a second leg extending substantially perpendicularly from said uprights when said arms are in draft position, a fifth wheel pivotally carried by the outer end of said last-named legs, and means carried by said uprights and engaging said arms to pivot the same about said shaft to raise said fifth wheel above the upper ends of said uprights, said means comprising a telescopic assembly pivotally mounted in one of its ends to and between a lower portion of said uprights, a bracket having one of its ends pivotally mounted to said shaft and its opposite ends secured to said intermediate portions of said arms, said telescopic assembly having its opposite end pivotally secured to an intermediate portion of said bracket.

13. A kit for tractors and the like comprising a pair of spaced, parallel uprights, a shaft extending between the upper ends of said uprights, a pair of parallel L-shaped arms, each of said L-shaped arms having one of its ends pivotally mounted on said shaft, each of said arms having a leg paralleling one of said uprights when said arms are in draft position, each of said arms having a second leg extending substantially perpendicularly from said uprights when said arms are in draft position, a fifth wheel pivotally carried by the outer end of said last-named legs, means carried by said uprights and engaging said arms to pivot the same about said shaft to raise said fifth wheel above the upper ends of said uprights, said means comprising a telescopic assembly pivotally mounted in one of its ends to and between a lower portion of said uprights, and a bracket having one of its ends pivotally mounted to said shaft and its opposite ends secured to said intermediate portions of said arms, said telescopic assembly having its opposite end pivotally secured to an intermediate portion of said bracket, said intermediate portion of said bracket being located at a point spaced from said first-named arm legs in the direction of said second-named arm legs.

14. A kit for tractors and the like comprising a pair of spaced, parallel uprights, a shaft extending between the upper ends of said uprights, a pair of parallel L-shaped arms, each of said L-shaped arms having one of its ends pivotally mounted on said shaft, each of said arms having a leg paralleling one of said uprights when said arms are in draft position, each of said arms having a second leg extending substantially perpendicularly from said uprights when said arms are in draft position, a fifth wheel pivotally carried by the outer end of said last-named legs, means carried by said upright and engaging said arms to pivot the same about said shaft to raise said fifth wheel above the upper ends of said uprights, said means comprising a telescopic assembly pivotally mounted in one of its ends to and between a lower portion of said uprights, a bracket having one of its ends pivotally mounted to said shaft and its opposite ends secured to said intermediate portions of said arms, said telescopic assembly having its opposite end pivotally secured to an intermediate portion of said bracket, king-pin-engaging jaws carried by said fifth wheel, means for opening said jaws to release said kingpin, and means carried by one of said uprights and operable in response to initial movement of one of said arms away from said draft position to render said jaw-opening means inoperative.

References Cited by the Examiner

UNITED STATES PATENTS 2,710,224  6/55  Horvath _____ 298—20

MILTON BUCHLER, *Primary Examiner.*

RALPH D. BLAKESLEE, *Examiner.*